United States Patent [19]
Nakatani et al.

[11] Patent Number: 4,600,364
[45] Date of Patent: Jul. 15, 1986

[54] FLUID OPERATED PUMP DISPLACEMENT CONTROL SYSTEM

[75] Inventors: Tohru Nakatani, Kawasaki; Teruo Akiyama, Yokohama, both of Japan

[73] Assignee: Kabushiki Kaisha Komatsu Seisakusho, Tokyo, Japan

[21] Appl. No.: 621,555

[22] Filed: Jun. 18, 1984

[30] Foreign Application Priority Data

Jun. 20, 1983 [JP] Japan ................. 58-109208
Jun. 20, 1983 [JP] Japan ................. 58-109209
Jun. 20, 1983 [JP] Japan ................. 58-93254[U]

[51] Int. Cl.$^4$ ............................................. F04B 49/00
[52] U.S. Cl. .................................... 417/216; 60/449; 60/452; 417/218; 417/222
[58] Field of Search .................. 417/218, 216, 222; 60/449, 452, 445, 450, 389; 91/374

[56] References Cited

U.S. PATENT DOCUMENTS

| | | | |
|---|---|---|---|
| 3,732,036 | 5/1973 | Busbey et al. | 417/216 |
| 3,820,920 | 6/1974 | Klimaszewski et al. | 417/218 X |
| 3,875,849 | 4/1975 | Patel | 91/374 X |
| 3,891,354 | 6/1975 | Bosch | 417/216 |
| 4,157,233 | 6/1979 | Horiuchi | 417/218 |
| 4,420,937 | 12/1983 | Naruse et al. | 60/450 |
| 4,478,136 | 10/1984 | Heiser et al. | 417/222 |

FOREIGN PATENT DOCUMENTS 2363480  6/1975  Fed. Rep. of Germany ...... 417/221

Primary Examiner—Edward K. Look
Attorney, Agent, or Firm—Frost & Jacobs

[57] ABSTRACT

A control system for a variable displacement pump or pumps driven by a vehicular engine for supplying pressurized fluid to implement actuators via implement control valves. The engine has several output conditions each with a different output torque characteristic. The control system includes a servomechanism comprising a servoactuator section coupled to the pump for varying the per cycle displacement thereof, a servovalve section for operating the servoactuator section by fluid pressure from a fixed displacement pump, and a control section for actuating the servovalve section. The servomechanism control section is fluid operated from a torque control valve, which delivers a controlled degree of fluid pressure from the fixed displacement pump to the control section in order to correspondingly vary the torque requirement of the variable displacement pump. The torque control valve is solenoid operated from a controller in association with a sensor capable of sensing each output condition in which the engine operates, in such a way that the torque requirement of the pump is controlled to suit the sensed output condition of the engine. The servomechanism control section is further under the control of a drain sensor effective to control the pump displacement in accordance with the flow rate of the fluid being drained from the implement control valves.

3 Claims, 18 Drawing Figures

FLUID OPERATED PUMP DISPLACEMENT CONTROL SYSTEM

BACKGROUND OF THE INVENTION

This invention pertains to a fluid operated control system for a variable displacement pump or pumps driven by a prime mover such as an internal combustion engine, as in a materials handling vehicle such as an earth mover. The invention is more specifically directed to a system for controlling the per cycle displacement of the pump or pumps to suit the torque requirement thereof to each of several different output conditions of the prime mover.

Typical of known pump displacement control systems of the type under consideration is the one wherein the torque demand (the product of the delivery rate and pressure) of a variable displacement pump is predetermined to correspond to the output torque rating of the internal combustion engine driving the pump. The pump displacement is controlled so as to maintain its torque requirement at the predetermined value regardless of the different output conditions into which the engine may be set by the control lever of the fuel injection pump. The constant torque control of the pump is subject to the objection that the torque rise of the engine when it is in less than the maximum output condition cannot possibly be utilized for driving the pump.

An additional drawback of the known constant torque pump control system also manifests itself when the engine is working in such a speed setting that the maximum engine output torque falls short of the torque rating. The engine has been easy to stall when the horsepower demand of the pump exceeds the maximum horsepower capability of the engine in that output condition. The fuel consumption efficiency of the engine has also decreased by reason of its overloading.

SUMMARY OF THE INVENTION

The present invention defeats the noted weaknesses of the prior art and makes it possible to control the torque demand of a variable displacement pump or pumps in accordance with each of several different output conditions of the engine or like prime mover driving the pump or pumps. The pump control system of this invention enables the pump or pumps to make effective use of the engine output horsepower in its complete speed range. Further the system is well adapted to prevent the stalling of the engine in its less than the maximum output condition and to improve the fuel consumption efficiency of the engine.

Stated broadly, the pump control system of this invention comprises at least one variable displacement pump and a fixed displacement pump, with at least the variable displacement pump driven by a prime mover having a plurality of output conditions each with a different output torque characteristic. An important component of the control system is a fluid operated servomechanism comprising a servoactuator section coupled to the variable displacement pump for varying the per cycle displacement thereof, a servovalve section for operating the servoactuator section by fluid pressure from the fixed displacement pump, and a control section for controllably actuating the servovalve section in response to fluid pressure actuation. The servoactuator section, servovalve section, and control section of the servomechanism are further so associated with one another that the controlled fluid pressure actuation of the control section results in a controlled change in the displacement, and therefore the torque requirement, of the variable displacement pump. Employed for the fluid pressure actuation of the servomechanism control section is a torque control valve capable of operating the servomechanism control section by a controlled degree of fluid pressure from the fixed displacement pump so as to cause the servomechanism to correspondingly vary the torque requirement of the variable displacement pump. The torque control valve is itself actuated by control means comprising a sensor for sensing the output condition in which the prime mover operates, and a controller responsive to the sensor output for actuating the torque control valve so as to cause the same to control the torque requirement of the variable displacement pump in accordance with the sensed output condition of the prime mover.

The change in the torque requirement of the variable displacement pump to suit each output condition of the prime mover makes it possible to automatically control the torque requirement in conformity with the particular output torque characteristic of the prime mover in that output condition. The output horsepower of the prime mover can therefore be effectively utilized for driving the pump in its entire speed range. Further, when the prime mover is in the minimum output condition, for example, the horsepower demand of the pump may be reduced to such an extent as to prevent the stalling of the prime mover.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

General

Figure 1:
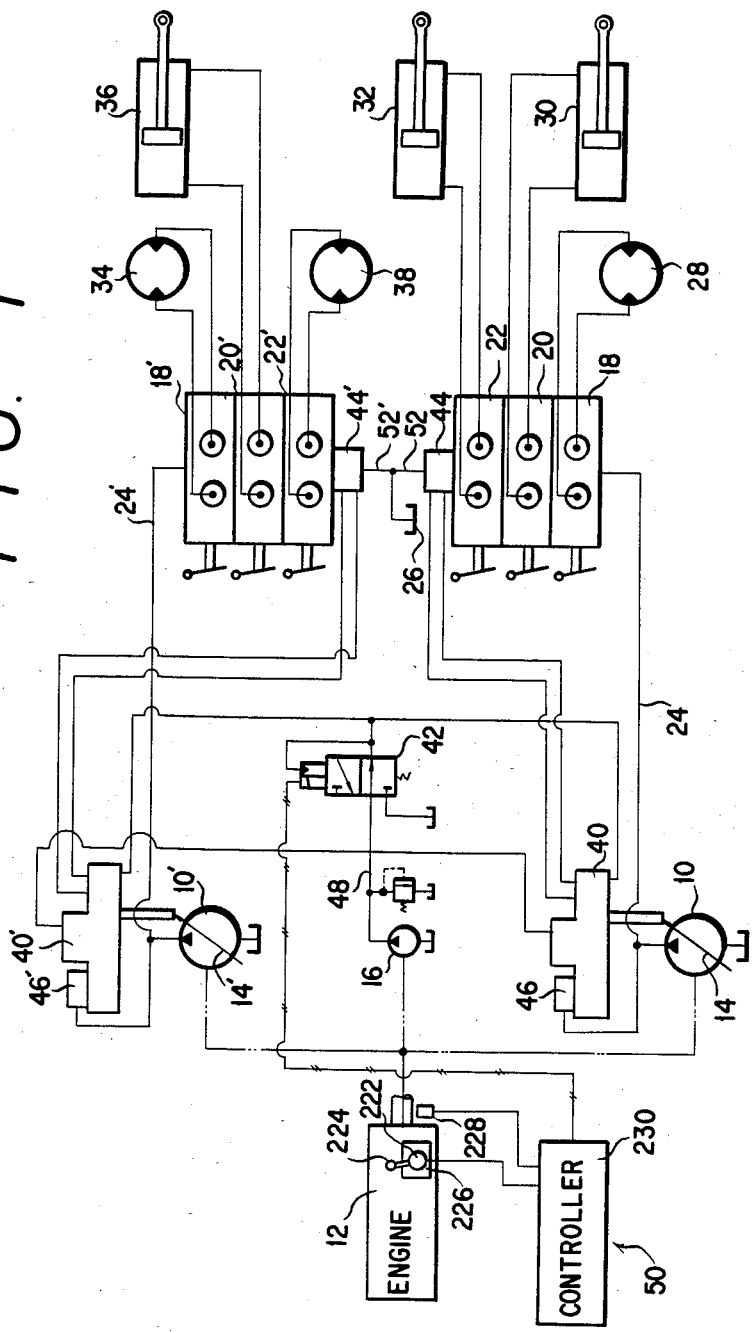
FIG. 1 is a diagrammatic representation showing the general organization of the pump displacement control system embodying the principles of the present invention, the control system being herein shown adapted for controlling two variable displacement pumps driven by a common internal combustion engine.

The general organization of the variable displacement pump control system in accordance with the invention will be best understood from a consideration of FIG. 1. This figure shows the pump control system as adapted for use in a self propelled, off highway work machine having a pair of variable displacement pumps 10 and 10' driven by a common prime mover such as an internal combustion engine 12. Both pumps 10 and 10' may be of conventional design having, for example, swash plates 14 and 14'. A change in the angular position of these swash plates results in a change in the per cycle displacement of the pumps 10 and 10'. The engine 12 also drives another pump 16, a fixed displacement pump of smaller capacity, which supplies control pressure for varying the displacement of the pumps 10 and 10'.

The first variable displacement pump 10 supplies fluid under pressure, preferably hydraulic oil, to a parallel connection of implement control valves 18, 20 and 22 by way of a supply conduit 24. Each in the form of a three position, directional control valve, the implement control valves 18, 20 and 22 function under the vehicle operator's control to selectively place associated implement actuators in communication with the pump 10 and with a fluid drain at 26. The implement actuators are herein shown as a hydraulic motor 28 and cylinders 30 and 32. The second variable displacement pump 10' is likewise connected to another similar set of implement control valves 18', 20' and 22' by way of a supply conduit 24'. Associated with this second set of implement control valves is a second group of implement actuators 34, 36 and 38, each to be selectively communicated with the pump 10' and with the fluid drain 26 by the associated implement control valve.

Employed for varying the displacement of the pumps 10 and 10' are servomechanisms 40 and 40', respectively, which operate the swash plates 14 and 14' of the pumps. The servomechanisms 40 and 40' are under the control of a common torque control valve 42, respective drain sensors 44 and 44', and respective cutoff valves 46 and 46'.

The torque control valve 42 is connected to the supply conduit 48 of the fixed displacement pump 16 for controlling the delivery of its output pressure to the servomechanisms 40 and 40'. This valve is solenoid operated from electrical control means 50, associated with the engine 12, to cause the servomechanisms 40 and 40' to vary the pump displacement in accordance any of several predetermined different output conditions in which the engine operates.

The drain sensors 44 and 44' are provided respectively to drain conduits 52 and 52' downstream of the two sets of implement control valves 18 through 22 and 18' through 22'. Sensing the static and dynamic pressures of the fluid being drained, the drain sensors 44 and 44' function to cause the sevomechanisms 40 and 40' to vary the pump displacement as required by the implement actuators 28 through 32 and 34 through 38, respectively.

The cutoff valves 46 and 46' directly communicate respectively with the outlets of the pumps 10 and 10'. When the delivery pressures of these pumps rise to a predetermined value, the cutoff values 46 and 36' operate to cause the servomechanisms 40 and 40' to reduce the pump displacement.

Figure 2:
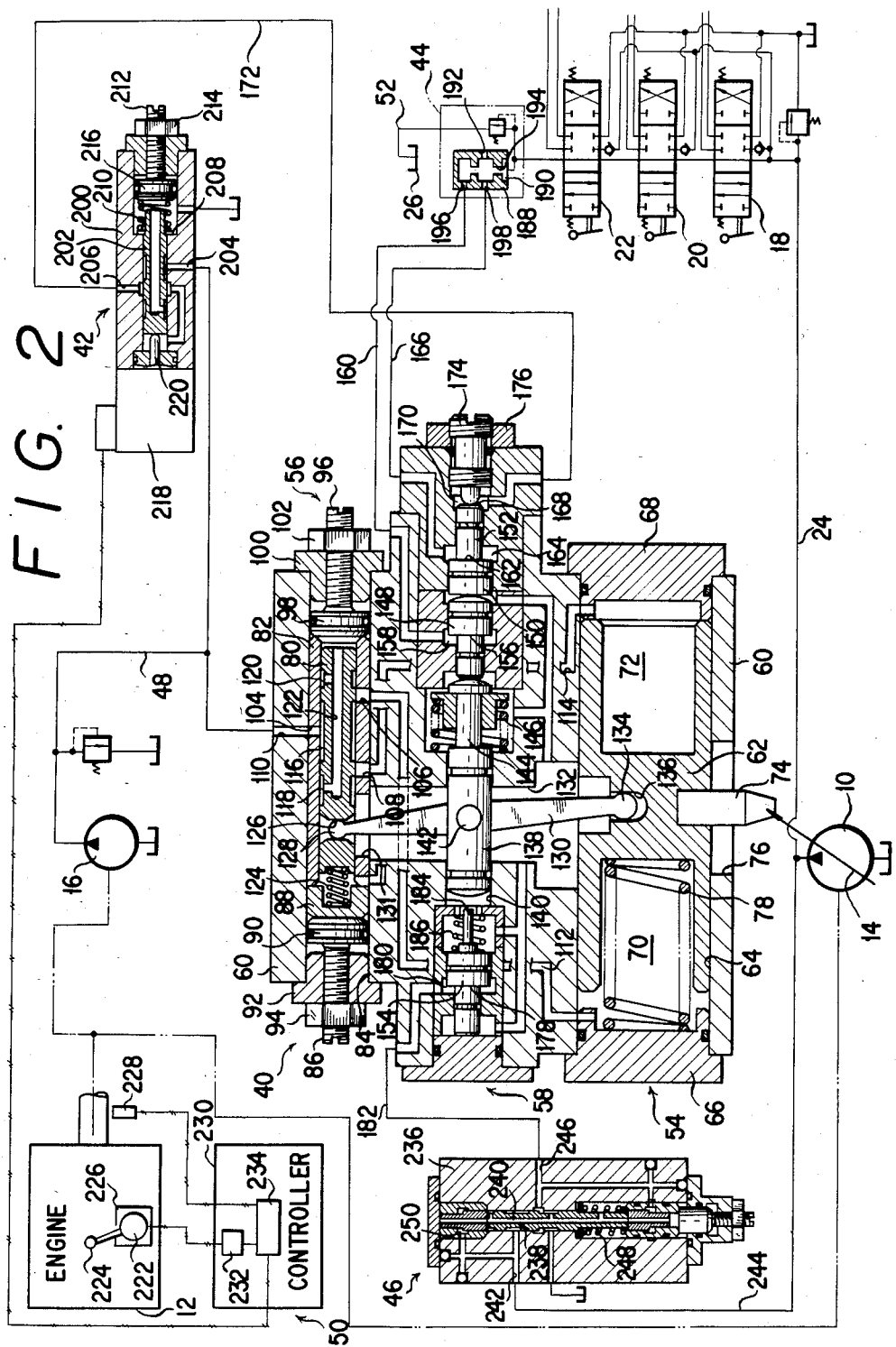
FIG. 2 is a partly sectional and partly schematic illustration showing in a greater detail the means included in the control system of FIG. 1 and employed for controlling one of the two pumps, the other pump being controlled in a like manner.

Given hereafter, with reference directed primarily to FIG. 2, is a more extensive discussion of the above listed components of the pump displacement control system. Since the two variable displacement pumps 10 and 10' are controlled in a like manner, FIG. 2 shows only the first pump 10 together with the associated servomechanism 40, torque control valve 42, drain sensor 44, cutoff valve 46, and electrical controls 50. The servomechanism 40' and drain sensor 44' for the second pump 10' are identical in construction and operation with the servomechanism 40 and drain sensor 44 seen in FIG. 2. The torque control valve 42 and electrical controls 50 are common to both pumps 10 and 10'.

Servomechanism

The representative servomechanism 40, the principal component of the control system, broadly comprises:

1. A servoactuator section 54 for acting directly on the variable displacement pump 10.
2. A servovalve section 56 for controlling fluid pressure communication between fixed displacement pump 16 and servoactuator section 54.
3. A control section 58 for actuating the servovalve section 56.

The above three sections of the servomechanism 40 share a common housing 60.

The servoactuator section 54 has a servopiston 62 slidably fitted in a bore 64 in the housing 60. Closing the opposite ends of the bore 64, a pair of end covers 66 and 68 coact with the servopiston 62 to define a pair of fluid chambers 70 and 72 on its opposite sides. The servopiston 62 has an actuator arm 74 embedded therein and projecting out of the servomechanism housing 60 through a slot 76. The projecting end of the actuator arm 74 is operatively connected to the swash plate 14 of the pump 10, in such a manner that the linear travel of the servopiston 62 within the bore 64 results in a change in the displacement of the pump. The linear travel of the servopiston 62 takes place as the opposed fluid chambers 70 and 72 are selectively placed in and out of communication with the fixed displacement pump 16 by the servovalve section 56. A helical compression spring 78 acts between servopiston 62 and left hand end cover 66 to bias the former toward the illustrated extreme right hand position. Normally retained in this extreme right hand position under spring pressure, the servopiston 62 holds the pump 10 at minimum displacement.

For the selective delivery of the pressurized fluid from the fixed displacement pump 16 to the opposed fluid chambers 70 and 72 of the servoactuator section 54, the servovalve section 56 has a spool 80 slidably engaged in a guide sleeve 82. This guide sleeve is closely fitted in a bore 84 in the servomechanism housing 60, with the bore 84 extending parallel to the bore 64 of the servoactuator section 54. The left hand end of the guide sleeve 82 is held against an adjusting screw 86 via a spring seat 88 and slidable retainer 90. The adjusting screw 86 extends through an end cover 92 closing the left hand end of the bore 84 and has a locknut 94 fitted thereover. The right hand end of the guide sleeve 82, on the other hand, is held against another adjusting screw 96 via another slidable retainer 98. The adjusting screw 96 likewise extends through an end cover 100 closing the right hand end of the bore 84 and has a locknut 102 engaged thereon.

The guide sleeve 82 has an inlet passageway 104 and two outlet passageways 106 and 108 formed radially therein. The inlet passageway 104 communicates with the fixed displacement pump 16 via a fluid inlet 110 in the servomechanism housing 60. The outlet passageways 106 and 108 communicate with the opposed fluid chambers 70 and 72 of the servoactuator section 54 by way of passageways 112 and 114, respectively, in the servomechanism housing 60. The servovalve spool 80 has formed therein three annular grooves 116, 118 and 120 and an axial bore 122. A helical compression spring 124 biases the servovalve spool 80 rightwardly of the guide sleeve 82.

The servovalve spool 80 is further recessed at 126. Pivotably and slidably engaged in this recess is one end 128 of a control lever 130 extending with clearance through a radial opening 131 in the guide sleeve 82 and through a recess 132 formed in the servomechanism housing 60 so as to extend between the bores 64 and 84. The other end 134 of the control lever 130 is similarly engaged in a recess 136 in the servopiston 62 of the servoactuator section 54. The control lever 130 moves the servovalve spool 80 by being itself actuated by means in the control section 58, as well as by the servopiston 62, in a manner yet to be described. The recess 132 in the servomechanism housing 60 is capable of communication with the outlet passageways 106 and 108 in the guide sleeve 82 via the annular grooves 118 and 120 and axial bore 122 in the servovalve spool 80.

Normally the servovalve spool 80 lies in the illustrated position, holding the inlet passageway 104 out of communication with either of the outlet passageways 106 and 108. The servopiston 62 is therefore held in the illustrated minimum displacement position. On actuation, then, the servovalve spool 80 communicates the inlet passageway 104 with either of the outlet passageways 106 and 108 via the annular groove 116. The servopiston 62 will then travel in a desired direction under fluid pressure from the fixed displacement pump 16.

Intended to actuate the servovalve spool 80 via the control lever 130, the control section 58 has a control piston 138 slidably received in a bore 140 defined in the servomechanism housing 60 so as to extend parallel to the bores 64 and 84. The control lever 130 is medially coupled to the control piston 138 via a pivot pin 142. The control piston 138 has a rightward extension 144 of reduced diameter. A helical compression spring 146 acts between servomechanism housing 60 and control piston extension 144 to urge the latter into abutment against first 148, second 150 and third 152 biasing pistons, all arranged in alignment with the control piston 138. A fourth biasing piston 154 is provided on the left hand side of the control piston 138 and is normally held at a distance therefrom.

The first biasing piston 148 has an annular shoulder 156 open to a fluid chamber 158 in communication with the drain sensor 44 by way of a conduit 160. The second biasing piston 150 has an annular shoulder 162 open to a fluid chamber 164 also in communication with the drain sensor 44 by way of a conduit 166. The third biasing piston 152 has an end face 168 open to a fluid chamber 170 in communication with the torque control valve 42 by way of a conduit 172. The end face 164 of the third biasing piston 152 further butts on an adjusting screw 174 having a locknut 176. The fourth biasing piston 154 has an annular shoulder 178 open to a fluid chamaber 180 in communication with the cutoff valve 46 by way of a conduit 182. The fourth biasing piston 154 has a rightward extension 184 of reduced diameter for butting on the opposed end of the control piston 138. A helical compression spring 186 normally holds the fourth biasing piston extension 184 out of abutment against the control piston 138.

Drain Sensor

FIG. 2 also shows the drain sensor 44 for actuating the control piston 138 of the servomechanism 40 in accordance with the fluid pressure being drained from the implement control valves 18, 20 and 22. The drain sensor 44 comprises a casing 188 having a fluid inlet 190 for receiving the fluid being drained from the parallel connection of implement control valves 18 through 22, and a fluid outlet 192 in communication with the drain 26 by way of the conduit 52. Formed within the casing 188 is a flow restriction 194 intervening between inlet 190 and outlet 192. Further the casing 188 has first 196 and second 198 signal outlets formed therein. The first signal outlet 196 is intended for the delivery of a fluid signal representative of the total (both static and dynamic) pressure of the fluid being drained. The second signal outlet 198 is intended for the delivery of a fluid signal representative of the static pressure of the fluid.

The first signal outlet 196 communicates with the fluid chamber 158 of the servomechanism control section 58 by way of the conduit 160. The second signal outlet 198 communicates with the fluid chamber 164 of the servomechanism control section 58 by way of the conduit 166. The pressure in the fluid chamber 158 acts on the first biasing piston 148 in a direction away from the control piston 138 (i.e. the direction tending to decrease the displacement of the pump 10). The pressure in the fluid chamber 164 acts on the second biasing piston 150 in a direction toward the control piston 138 (i.e. the direction tending to increase the pump displacement). Thus the drain sensor 44 causes the displacement of the servomechanism control spool 138 in accordance with the difference between the total and static pressures of the fluid being drained through the drain conduit 52.

Figure 3:
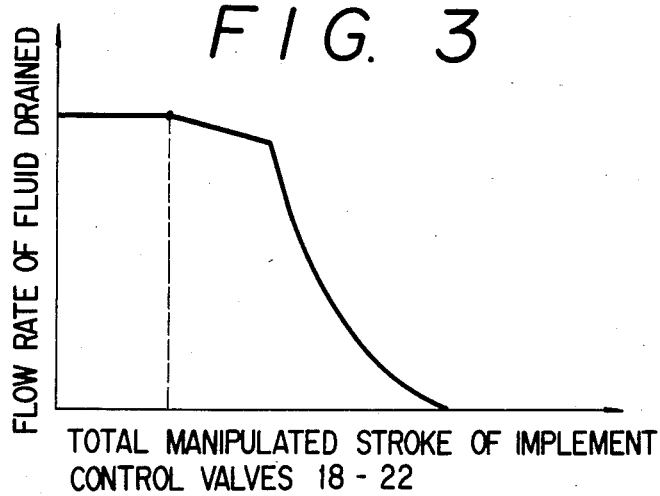
FIG. 3 is a graph plotting the relationship between the total operated stroke of the implement control valves and the flow rate of the fluid being drained, in the pump control system of FIGS. 1 and 2.
Figure 4:
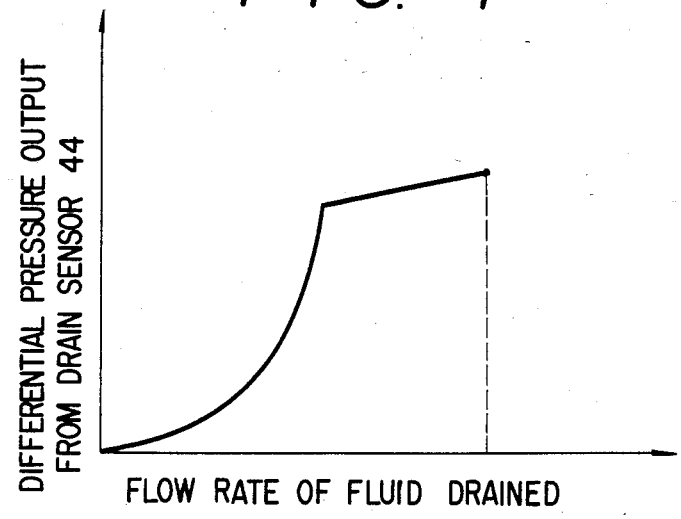
FIG. 4 is a graph plotting the relationship between the flow rate of the fluid being drained and the differential pressure output from the drain sensor in the pump control system of FIGS. 1 and 2.
Figure 5:
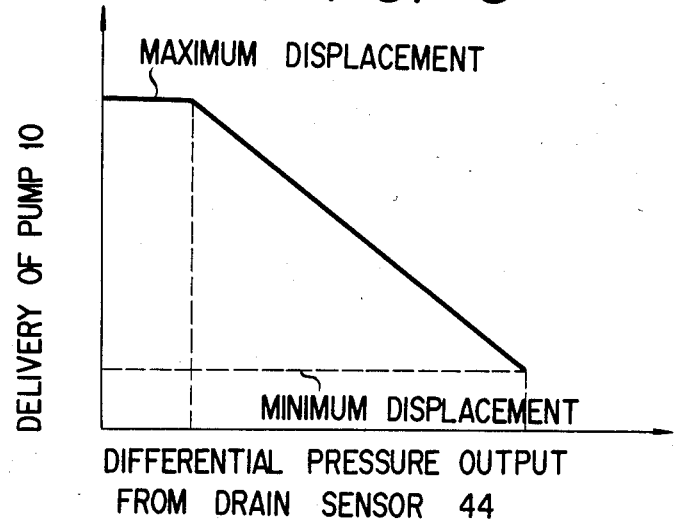
FIG. 5 is a graph plotting the relationship between the differential pressure output from the drain sensor and the delivery rate of the variable displacement pump as controlled in accordance with the drain sensor output, in the pump control system of FIGS. 1 and 2.

As will be understood from a consideration of FIGS. 3 and 4, the drain sensor 44 senses the total stroke of manipulation of the control elements of the implement control valves 18 through 22 from the flow rate of the fluid being drained and puts out the pressure differential representative of the total stroke. The servomechanism control spool 138 travels leftwardly, or in the direction tending to increase the displacement of the pump 10, with a decrease in the pressure differential. It will be discerned from FIG. 5 that the pump displacement is at a minimum when the pressure differential is maximum, and at a maximum when the pressure differential is minimum.

Torque Control Valve

With reference again to FIG. 2 the torque control valve 42 takes the form of a solenoid operated reducing valve. It includes a valve housing 200 having a spool 202 slidably mounted therein for reducing the pressure of the fluid flowing from inlet 204 to outlet 206. The fluid inlet 204 communicates with the fixed displacement pump 16 by way of the conduit 48. The fluid outlet 206 communicates with the fluid chamber 170 of the servomechanism control section 58 by way of the conduit 172.

The spool 202 has a flange 208 mounted thereon to serve as a seat for one extremity of a helical compression spring 210. The other extremity of this spring is held against an adjusting screw 212, complete with a locknut 214, via a slidable retainer 216. The force of the spring 210, adjustable by the screw 212, determines the degree to which the spool 202 reduces the fluid pressure.

Also effective to modify the force of the spring 210 is a proportional solenoid 218 having a plunger 220 butting on the spool 202. By the "proportional solenoid" is meant the one capable of thrusting the plunger with a force in proportion with the magnitude of the input energizing current. The energizing current is fed from the electrical controls 50, as will be set forth in more detail subsequently. In the absence of the energizing current the torque control valve 42 reduces the fluid pressure from the fixed displacement pump 16 to the extent determined by the force of the spring 210, for delivery to the fluid chamber 170 of the servomechanism control section 58. Upon energization of the proportional solenoid 218, then, the torque control valve 42 reduces the fluid pressure to a greater extent depending upon the magnitude of the energizing current. The servomechanism control piston 138 will then travel rightwardly, causing a decrease in the displacement of the pump 10.

Figure 6:
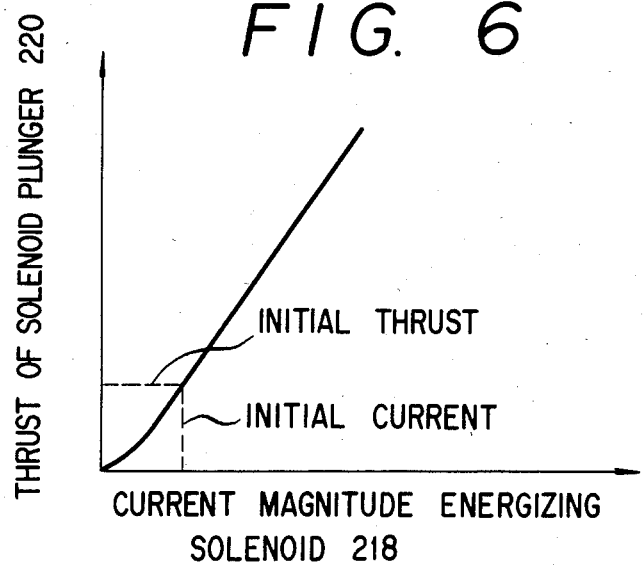
FIG. 6 is a graph plotting the relationship between the magnitude of the energizing current for the proportional solenoid of the torque control valve and the thrust of the solenoid plunger in the pump control system of FIGS. 1 and 2.

FIG. 6 graphically represents the proportional relationship between the magnitude of the current energizing the proportional solenoid 218 and the consequent thrust of the plunger 220. This plunger thrust is in inverse proportion with the output pressure of the torque control valve 42, also as graphically represented in FIG. 7. It will therefore be understood that the displacement of the pump 10 decreases with an increase in the magnitude of the current energizing the proportional solenoid 218 as in the graph of FIG. 8.

Electrical Controls

Closely associated with the torque control valve 42 are the electrical control means 50 seen in both FIGS. 1 and 2. In this particular embodiment the control means 50 include a potentiometric output sensor 222 for sensing the position of the control lever 224 of the standard fuel injection pump 226 for the internal combustion engine 12, and a speed sensor 228 for sensing the actual running speed of the engine 12. Voltage outputs from output sensor 222 and speed sensor 228 are both delivered to a controller 230, which is equipped to produce, in response to the input signals, the current of correspondingly controlled magnitude for energizing the proportional solenoid 218 of the torque control valve 42 as above.

Figure 9:
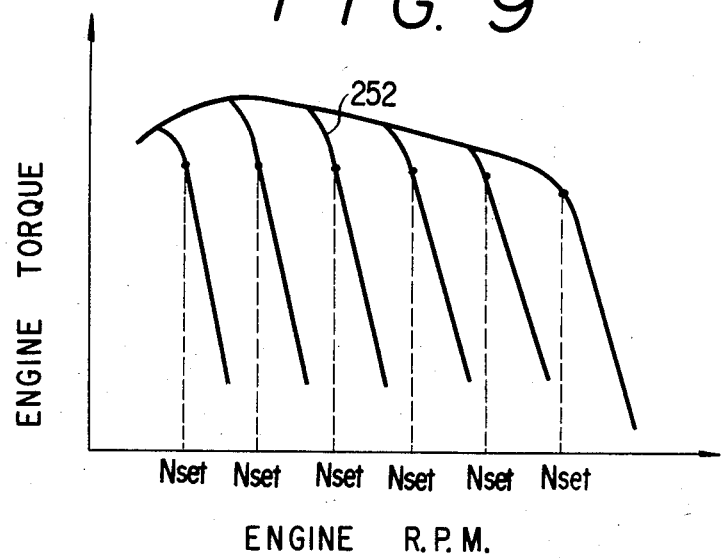
FIG. 9 is a graphic representation of the output torque characteristics of the engine in its various output conditions, the graph being further explanatory of the way the pump displacement is controlled by the system of FIGS. 1 and 2 in each output condition of the engine.

The engine 12 can be of conventional design having a plurality of output conditions offering different output torque characteristics as in the graph of FIG. 9. The potentiometric output sensor 222 senses that one of these different output conditions in which the engine 12 operates, from the position of the fuel injection pump control lever 224. The signal indicative of the sensed output condition of the engine is introduced from the output sensor 222 to the memory section 232 of the controller 230. The memory section 232 has stored therein a predetermined reference speed Nset, FIG. 9, for each output condition of the engine 12. As will be noted from FIG. 9, the reference speed Nset for each engine output condition should preferably be slightly off the speed range where the engine output torque is highest. In response to the output from the output sensor 222 the memory section 232 delivers to an arithmetic section 234, also included in the controller 230, a signal representative of the predetermined reference speed Nset of the particular output condition in which the engine 12 operates at that time.

Also delivered to the controller arithmetic section 234 is the output from the speed sensor 228 which represents the actual engine speed N in real time. The arithmetic section 234 constantly compares the actual engine speed N with the reference speed Nset. Whenever the actual engine speed falls below the reference speed, the arithmetic section 234 causes the controller 230 to deliver to the proportional solenoid 218 of the torque control valve 42 an energizing current with a magnitude corresponding to the difference (Nset−N) between the actual and reference engine speeds.

Figure 7:
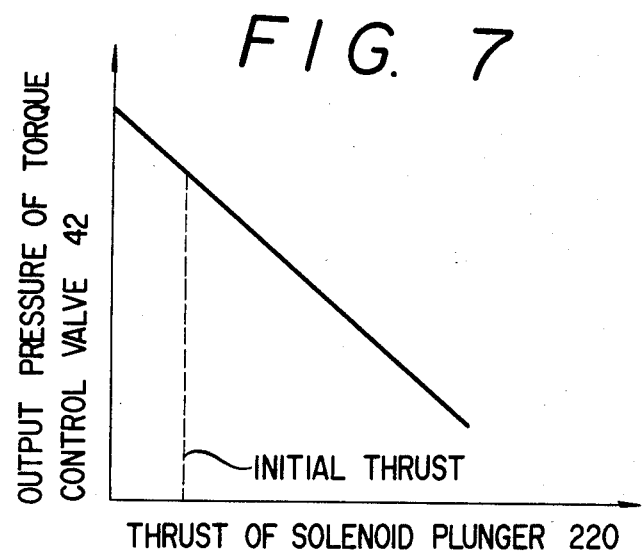
FIG. 7 is a graph plotting the relationship between the thrust of the plunger of the proportional solenoid and the output pressure of the torque control valve in the pump control system of FIGS. 1 and 2.
Figure 8:
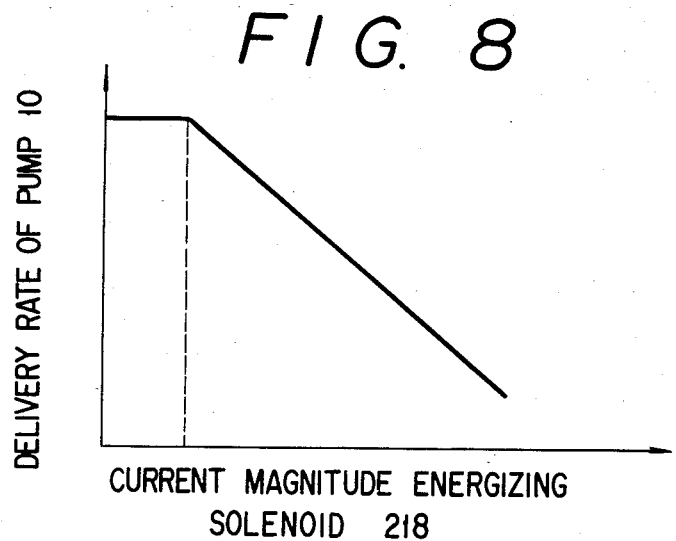
FIG. 8 is a graph plotting the relationship between the magnitude of the energizing current for the proportional solenoid of the torque control valve and the delivery rate of the variable displacement pump in the pump control system of FIGS. 1 and 2.

As has been mentioned with reference to FIGS. 6 through 8, the displacement of the pump 10 decreases with an increase in the magnitude of the current energizing the proportional solenoid 218. The current magnitude increases with the difference (Nset−N) between the actual and reference engine speeds. Thus, as the actual engine speed N falls below the reference speed Nset, the displacement of the pump 10 decreases in step with the magnitude of the difference (Nset−N).

Cutoff Valve

As shown in detail in FIG. 2, the cutoff valve 46 includes a valve housing 236 having a bore 238 in which a spool 240 is slidably mounted. Also formed in the valve housing 236 are a fluid inlet 242 in communication with the variable displacement pump 10 by way a conduit 244, and a fluid outlet 246 in communication with the fluid chamber 180 of the servomechanism control section 58 by way of the conduit 182. The spool 240 normally lies in the illustrated position under the bias of a compression spring 248, blocking communication between inlet 242 and outlet 246. The spool 240 is shouldered as at 250 to receive fluid pressure from the pump 10.

When the fluid pressure in the pump delivery conduit 244, and therefore in the conduit 24, rises to a predetermined degree, the spool 240 moves against the bias of the compression spring 248 to allow communication between inlet 242 and outlet 246. Passing the cutoff valve 46, the fluid pressure from the pump 10 is thereby reduced to an extent sufficient for actuating the biasing piston 154 of the servomechanism control section 58 in opposition to the force of the spring 186 and to any opposing force of the control piston 138. Thereupon the biasing piston 154 will move the control piston 138 rightwardly via the extension 184, until the displacement of the pump 10 decreases to a minimum.

Figure 10:
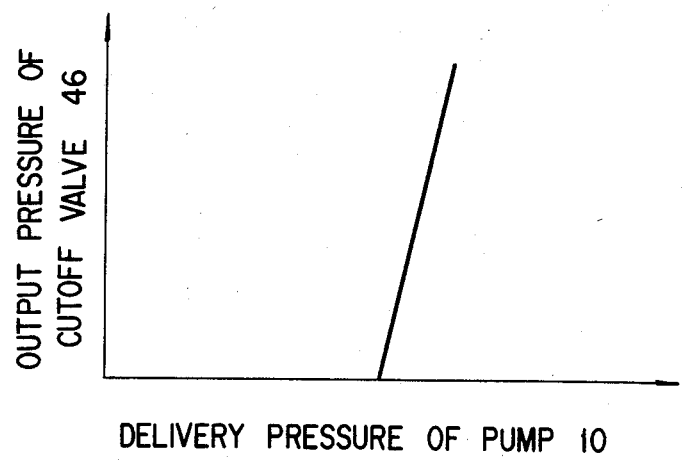
FIG. 10 is a graph plotting the relationship between the output pressure of the variable displacement pump and the output pressure of the cutoff valve in the pump control system of FIGS. 1 and 2.
Figure 11:
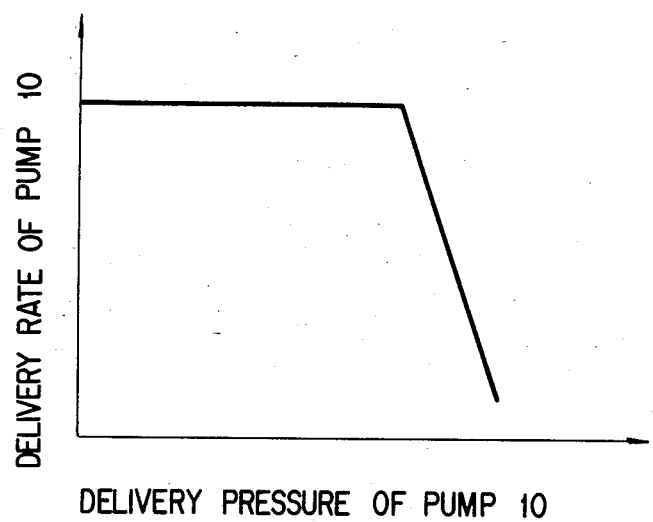
FIG. 11 is a graph plotting the relationship between the output pressure and delivery rate of the variable displacement pump as controlled by the cutoff valve in the pump control system of FIGS. 1 and 2.

It will be discerned from FIG. 10 that the cutoff valve 46 opens at a very high input pressure, just slightly below the maximum system pressure determined by the relief valve, not shown, provided to the pump 10. Further, as indicated in FIG. 11, the displacement of the pump 10 is reduced to a minimum whereas its output pressure is at a maximum.

Operation

Let it be assumed that the control lever 224 of the fuel injection pump 226 is now in such a position that the engine is in an intermediate output condition indicated at 252 in the graph of FIG. 9. When the implement control valves 18 through 22 are all in neutral, the differential pressure detected by the drain sensor 44 is at a maximum. The control piston 138 of the servomechanism control section 58 is therefore in the illustrated position, holding the spool 80 of the servovalve section 56 also in the illustrated position. The servovalve spool 80 when in this illustrated position holds the inlet passageway 104 out of communication with either of the outlet passageways 106 and 108. Consequently the servopiston 62 of the servoactuator section 54 lies in the ilustrated right hand position under the bias of the spring 78, holding the pump 10 at a minimum displacement.

The actual speed of the engine 12 is now higher than the predetermined reference speed Nset of the intermediate output condition 252 in which the engine is now in operation. The controller 230 delivers no energizing current to the proportional solenoid 218 of the torque control valve 42, so that the output pressure of the torque control valve does not actuate the servomechanism control piston 138.

As any of the implement control valves 18 through 22 is hand operated to deliver part of the output pressure of the pump 10 to the associated one of the implement actuators 28 through 32, the flow rate of the fluid being drained through the conduit 52 decreases. This results in a corresponding decrease in the differential pressure output from the drain sensor 44. Thereupon, as has been mentioned, the servomechanism control piston 138 travels to the left, causing the control lever 130 to pivot in a counterclockwise direction about its end 134 engaged in the recess 136 in the servopiston 62. Engaged in the recess 126 in the servovalve spool 80, the other end 128 of the control lever 130 causes the servovalve spool to travel leftwardly against the force of the spring 124. Now the inlet passageway 104 communicates with the outlet passageway 108 via the annular groove 116 in the servovalve spool 80. Then the fixed displacement pump 16 delivers its output to the right hand fluid chamber 72 of the servoactuator section 54 by way of the passageway 114 in the servomechanism housing 60. Thus the servopiston 62 travels leftwardly against the force of the spring 78, causing an increase in the displacement of the pump 10.

Further, upon leftward displacement of the servopiston 62, the control lever 130 is pivoted again, this time in a counterclockwise direction about the pivot pin 142, with the result that the servovalve spool 80 travels rightwardly to block communication between inlet passageway 104 and outlet passageway 108. Thus the displacement of the pump 10 increases just to an extent corresponding to the decrease in the differential pressure output from the drain sensor 44. It will be appreciated that the control lever 130 serves the purpose of feeding back the displacement of the servopiston 62 to the servovalve spool 80, in addition to that of transmitting the motion of the control piston 138 to the servovalve spool.

As the actual engine speed N drops past the reference speed Nset, the controller 230 energizes the proportional solenoid 218 of the torque control valve 42 with a current magnitude corresponding to the difference (Nset−N) between the actual and reference speeds. Thus thrusted forwardly, the solenoid plunger 220 causes the torque control valve spool 202 to decrease the pressure of the outgoing fluid. The consequent decrease in the fluid pressure in the chamber 170 of the servomechanism control section 58 allows the control piston 138 to travel rightwardly under the bias of the spring 146. Thereupon the displacement of the pump 10 decreases through the reversal of the above described procedure when the pump displacement increases.

It will have been understood that whenever the actual engine speed falls below the reference speed because of an increase in the load on the implement actuator in operation, the displacement of the pump 10 is decreased to an extent determined by the difference between the actual and reference engine speeds. The torque requirement of the pump 10 is thus varied in conformity with the output torque curve 252 of the engine 12 in the particular output condition in which the engine operates. The increased output pressure of the pump 10 will nevertheless be still lower than the pressure at which the cutoff valve 46 opens.

Thus, in accordance with the invention as embodied in the system of FIGS. 1 and 2, the torque demands of the variable displacement pumps 10 and 10' are automatically and individually controlled to suit the engine output torque characteristic in any of the several different output conditions in which the engine has been set. This makes it possible to make most effective use of the engine horsepower in its complete speed range.

SECOND FORM

General

Figure 12:
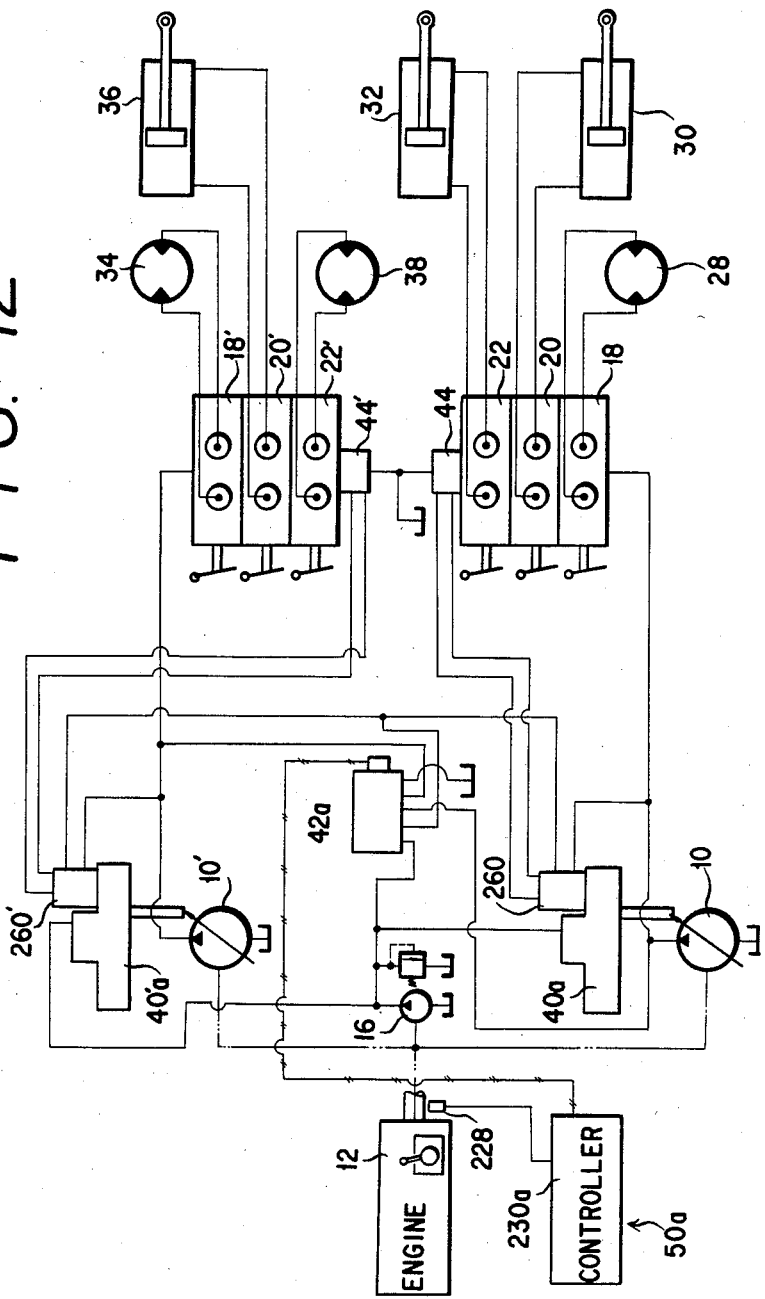
FIG. 12 is a diagrammatic representation of the general organization of another preferred form of the control system in accordance with the invention, the control system being herein also shown adapted for controlling two variable displacement pumps driven by a common internal combustion engine.
Figure 13:
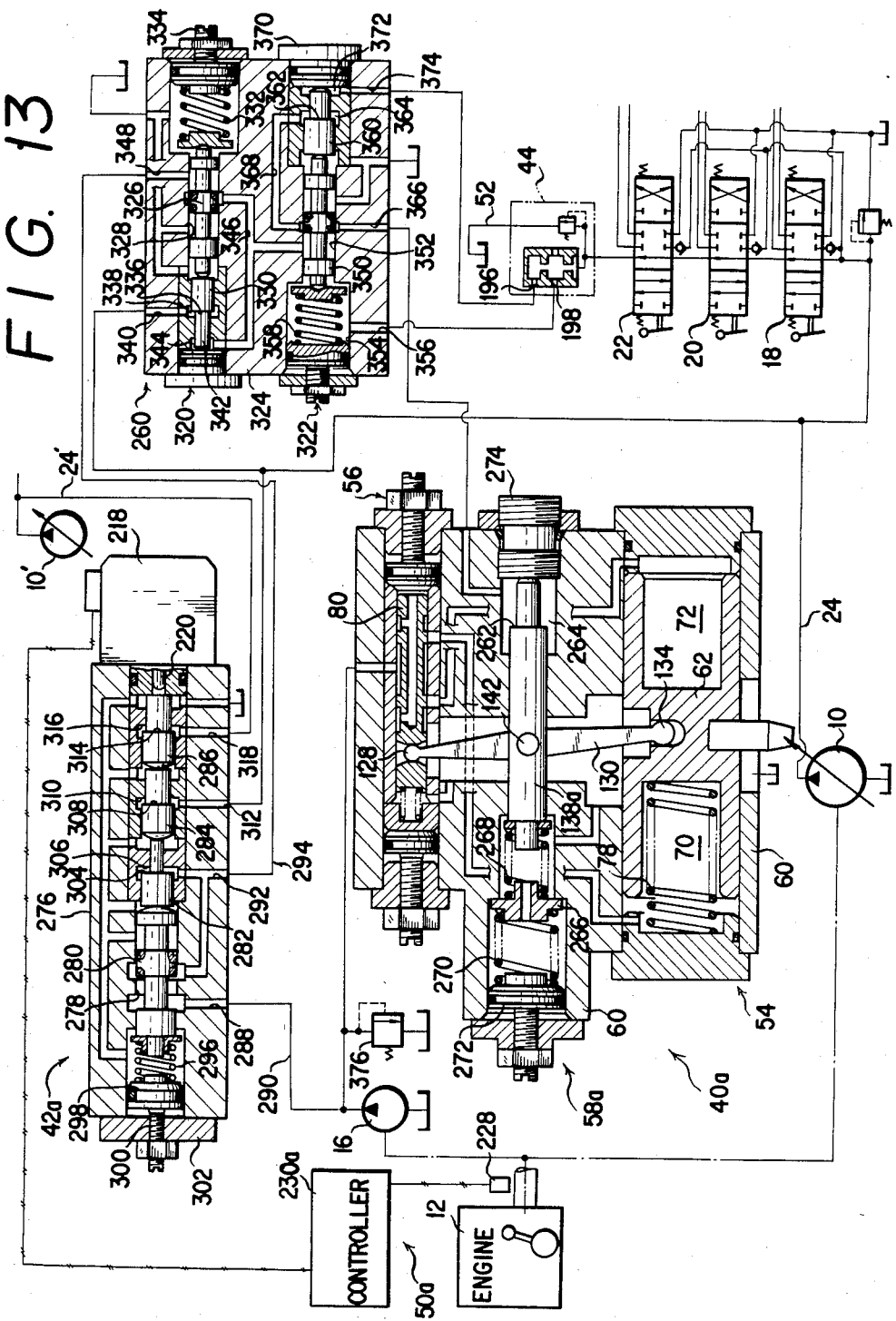
FIG. 13 is a partly sectional and partly schematic illustration of the means in the control system of FIG. 12 for controlling one of the pumps, the other pump being controlled in a like manner.

The second preferred embodiment of the invention, shown in FIGS. 12 and 13, operates on a slightly modified principle but is akin to the FIGS. 1 and 2 embodiment in that the pump displacement is controlled in a manner suiting each output condition of the engine.

As will be noted from FIG. 12, the modified pump control system is also shown to comprise the pair of variable displacement pumps 10 and 10' and the fixed displacement pump 16, all driven by the internal combustion engine 12. The first variable displacement pump 10 serves the first group of implement actuators 28, 30 and 32 via the parallel connection of implement control valves 18, 20 and 22. The second variable displacement pump 10' serves the second group of implement actuators 34, 36 and 38 via the parallel connection of implement control valves 18', 20' and 22'.

A pair of servomechanisms 40a and 40'a controllably vary the per cycle displacement of the pumps 10 and 10' respectively. Modified in construction from the servomechanisms 40 and 40', the servomechanisms 40a and 40'a are under the control of a common torque control valve 42a, the respective drain sensors 44 and 44', and respective cutoff and negative control valve assemblies 260 and 260'. The torque control valve 42a is solenoid operated from electrical control means 50a associated with the engine 12.

Only the drain sensors 44 and 44' of the above listed control means of this second embodiment are identical with those of the first embodiment. The following, then, is the detailed description of the servomechanisms 40a and 40'a, torque control valve 42a, electrical control means 50a, and cutoff and negative control valve assemblies 260 and 260'. The pair of servomechanisms 40a and 40'a, as well as the pair of cutoff and negative control valve assemblies 260 and 260', are both identical in construction, so that only one of each pair will be described in detail, it being understood that the same description applies to the other.

Servomechanism

With reference to FIG. 13 the representative servomechanism 40a, associated with the first variable displacement pump 10, comprises the servoactuator section 54, the servovalve section 56, and a control section 58a, all sharing the housing 60. The servoactuator section 54 and servovalve section 56 are of the same construction as in the FIGS. 1 and 2 embodiment, so that their description is considered unnecessary. The various parts of these sections will be identified, as necessary, with the same reference numerals as in the preceding embodiment.

The modified control section 58a of the servomechanism 40a includes a control piston 138a slidably mounted in the servomechanism housing 60. The control piston 138a has a shoulder 262 open to a fluid chamber 264. This fluid chamber is to be pressurized from the cutoff and negative control valve assembly 260 for exerting leftward pressure on the control piston 138a. The left hand end of the control piston 138a is held opposite a spring seat 266, with a compression spring 268 interposed therebetween. Another compression spring 270 extends between the spring seat 266 and a retainer 272. Normally sprung into abutment against an adjusting screw 274, the control piston 138a is to be displaced leftwardly against the combined forces of the springs 268 and 270 by fluid pressure in the chamber 264.

As in the preceding embodiment the control lever 130 is medially pivoted at 142 to the control piston 138a and has its opposite ends 128 and 134 operatively engaged with the servopiston 62 of the servoactuator section 54 and with the spool 80 of the servovalve section 56. The control lever 130 is normally positioned to hold the servopiston 62 in the illustrated position of minimum pump displacement. The other details of construction of the modified servomechanism 40a are as set forth above in connection with the servomechanism 40 shown in FIG. 2.

Torque Control Valve

The modified torque control valve 42a also takes the form of a solenoid operated, variably reducing valve. It includes a valve housing 276 having a bore 278. Slidably mounted in the bore 278 in a row are a spool 280 and first 282, second 284 and third 286 biasing pistons. The spool 280 controls the pressure of the fluid flowing from an inlet 288 in communication with the fixed displacement pump 16 by way of a conduit 290 to an outlet 292 in communication with the cutoff and negative control valve assembly 260 by way of a conduit 294. A helical compression spring 296 extends between the left hand end of the spool 280 and a retainer 298 held against an adjusting screw 300 extending through an end cover 302 closing the left hand end of the bore 278. The spring 296 energizes the spool 280 in a direction tending to increase the pressure of the fluid flowing from inlet 288 to outlet 292.

The right hand end of the spool 280 is held against the first biasing piston 282 having a shoulder 304 open to a fluid chamber 306. This fluid chamber communicates with the outlet 292, so that the output pressure of this torque control valve acts on the spool 280 in a direction tending to reduce the output pressure against the force of the spring 296.

The second biasing piston 284 has a shoulder 308 open to a fluid chamber 310 in communication with the supply conduit 24 of the first variable displacement pump 10 by way a passageway 312. The third biasing piston 286 also has a shoulder 314 open to a fluid chamber 316 in communication with the supply conduit 24' of the second variable displacement pump 10' by way of a passageway 318. The fluid pressures in the chambers 310 and 316 also act on the spool 280 in the direction tending to reduce the output pressure of the torque control valve 42a.

Mounted to the right hand end of the torque control valve housing 276 is the proportional solenoid 218 having the plunger 220 for butting on the right hand end of the third biasing piston 286. The proportional solenoid 218 is electrically connected to the electrical control means 50a as in the preceding embodiment.

Electrical Controls

As shown in both FIGS. 12 and 13, the electrical control means 50a include the speed sensor 228 for sensing the output condition of the engine 12 from its actual running speed. The output from the speed sensor 208 is fed to a controller 230a connected to the proportional solenoid 218 of the torque control valve 42a. The controller 230a has stored therein data representative of the output torque characteristic of the engine in each of its several different output conditions. In response to the output from the speed sensor 228 the controller 230 energizes the proportional solenoid 218 with a current magnitude corresponding to the difference between the torque requirement of the pump in the detected output condition of the engine and the torque requirement of the pump in the maximum output condition (rated torque) of the engine, as will be better understood from the subsequent description of operation.

Cutoff and Negative Control Valve Assembly

The cutoff and negative control valve assembly 260 comprises a cutoff valve section 320 and a negative control valve section 322 sharing a valve housing 324. The cutoff valve section 320 includes a spool 326 slidably mounted in a bore 328 in the common valve housing 324. The spool 326 is biased leftwardly into end to end abutment against a biasing piston 330 by a spring 332 acting between the right hand end of the spool and an adjusting screw 334. The biasing piston 330 has a shoulder 336 open to a fluid chamber 338. This fluid chamber communicates with the supply conduit 24 of the first variable displacement pump 10 via a fluid inlet 340. The biasing piston 330 has a reduced diameter portion 342 extending leftwardly from the shoulder 336 and projecting into a fluid chamber 344. The fluid chamber 344 communicates by way of a passageway 346 with another fluid inlet 348, which is in communication with the outlet 292 of the torque control valve 42a by way of the conduit 294. The spool 326 controls communication between passageway 346 and inlet 348.

The negative control valve section 322, on the other hand, controls communication between the cutoff valve section 320 and the fluid chamber 264 of the servomechanism control section 58a in response to the differential pressure output from the drain sensor 44. Included is a spool 350 slidably received in a bore 352 defined in the valve housing 324. The left hand end of the spool 350 is open to a fluid chamber 354 in communication with the signal outlet 198 of the drain sensor 44 via an inlet 356. As has been stated in conjunction with the FIGS. 1 and 2 embodiment, the signal outlet 198 of the drain sensor 44 is intended for the delivery of the fluid pressure representative of the static pressure component of the fluid being drained from the implement control valves 18 through 22 through the drain conduit 52.

A spring 358 is accommodated in the fluid chamber 354 for urging the spool 350 into end to end abutment against a biasing piston 360. This piston has a shoulder 362 open to a fluid chamber 364 in communication with a fluid outlet 366 through a passageway 368. The outlet 366 leads to the fluid chamber 264 of the servomechanism control section 58a. The right hand end of the biasing piston 360, normally held against an end cover 370, is open to a fluid chamber 372 in communication with a fluid inlet 374 leading to the signal outlet 196 of the drain sensor 44. Thus the fluid chamber 372 receives from the drain sensor 44 the fluid pressure representative of the total pressure of the fluid being drained.

Operation of Second Form

In the operation of the control system constructed as in FIGS. 12 and 13, the flow rate of the fluid being drained through the conduit 52 is maximum when all the implement control valves 18 through 22 are in neutral. Consequently the maximum possible difference exists between the total and static pressures of the fluid sensed by the drain sensor 44. The drain sensor delivers the fluid signal indicative of the total pressure to the chamber 372 of the negative control valve 322, and the fluid signal indicative of the static pressure to the chamber 354 of the negative control valve. The maximum difference between the two fluid signals combines with the fluid pressure in the chamber 364, in communication with the outlet 117, to cause leftward displacement of the spool 350 against the force of the spring 358 to such an extent that the output pressure of the negative control valve 322 is reduced to a minimum.

The delivery pressure of the variable displacement pump 10 is also at a minimum at this time. This minimum pump pressure in the fluid chamber 310 of the torque control valve 42a is defeated by the force of the spring 296, allowing the torque control valve spool 280 to be sprung to its extreme right hand position. The spool 280 establishes full communication between inlet 288 and outlet 292. Thus the full output pressure of the fixed displacement pump 16, determined by a relief valve 376, travels through the torque control valve 42a to the inlet 348 of the cutoff valve 320.

The cutoff valve 320 also receives the minimum pump output pressure in its chamber 338 through the inlet 340. The cutoff valve spool 326 is therefore displaced to its extreme left hand position by the force of the spring 332, thereby fully opening the flow path from inlet 348 to passageway 346. Accordingly the full output pressure of the fixed displacement pump 16 reaches the negative control valve 322 through the torque control valve 42a and cutoff valve 320.

However, the negative control valve 322 is now conditioned as aforesaid for minimum output pressure. The full output pressure of the fixed displacement pump 16 is therefore reduced to a minimum by the negative control valve 322, prior to delivery to the chamber 264 of the servomechanism control section 58a from the outlet 366.

The minimum fluid pressure in the chamber 264 of the servomechanism control section 58a allows the control spool 138a to be shifted rightwardly into abutment against the adjusting screw 274, as depicted in FIG. 13, by the combined forces of the springs 268 and 270. As has been mentioned in connection with FIG. 2, the control spool 138a when in this illustrated position holds the servopiston 62 in the extreme right hand position via the control lever 130 and servovalve 56, with the result that the displacement of the pump 10 is reduced to a minimum.

Upon actuation of the first implement control valve 18, for instance, for directing part of the output fluid of the first pump 10 to the implement actuator 28, the flow rate of the fluid being drained through the conduit 52 decreases correspondingly. The difference between the total and static pressures sensed by the drain sensor 44 also decreases correspondingly, with the result that the negative control valve spool 350 travels rightwardly to an extent determined by the reduced difference between the rightward force exerted thereon in the chamber 354, including that of the spring 358, and the leftward force in the chamber 372. The result is an increase in the pressure of the fluid flowing through the negative control valve 322 from the cutoff valve 320. Directed into the chamber 264 of the servomechanism control section 58a, the increased output pressure of the negative control valve 322 causes leftward displacement of the control spool 138a against the forces of the springs 268 and 270. The displaced control spool 138a acts on the servovalve spool 80 via the control lever 130, causing the servovalve 56 to introduce the pressurized fluid from the fixed displacement pump 16 into the right hand fluid chamber 72 of the servoactuator 54. The consequent leftward displacement of the servopiston 62 results in an increase in the displacement of the pump 10.

The control lever 130 turns clockwise about the pivot pin 142 upon leftward displacement of the servopiston 62 to cause reclosure of the servovalve 56. The displacement of the pump 10 is therefore increased only to an extent corresponding to the decrease in the pressure differential sensed by the drain sensor 44. The degree to which the control piston 138 travels leftwardly as above depends in part upon the forces of the springs 268 and 270. Accordingly the rate of increase in the pump displacement in response to the leftward travel of the control piston 138 may be varied as required through adjustment of the forces of the springs 268 and 270.

As the delivery pressure of the pump 10 increases, so does the pressure in the fluid chamber 310 of the torque control valve 42a, exerting a greater leftward force on the torque control valve spool 280 via the pistons 282 and 284. Then the torque control valve spool 280 travels leftwardly against the bias of the spring 296 and so reduces to a greater extent the pressure of the fluid flowing from the fixed displacement pump 16 toward the cutoff and negative control valve assembly 260. Consequently the pressure delivered to the chamber 264 of the servomechanism control section 58a via the cutoff and negative control valve assembly 260 decreases to allow rightward displacement of the control spool 138a under the bias of the springs 268 and 270. The displacement of the pump 10 is thus decreased.

If the pressure in the supply conduit 24 of the pump 10 builds up close to the maximum system pressure determined by the unshown relief valve provided to the supply conduit 24, the pressure in the chamber 338 of the cutoff valve 320 will rise correspondingly, causing rightward displacement of the spool 326 via the piston 330 against the effect of the spring 332. The rightward displacement of the spool 326 results in the reduction of the pressure of the fluid flowing from torque control valve 42a to the servomechanism control section 58a via the cutoff and negative control valve assembly 260.

With a further increase in the pressure in the supply conduit 24 the cutoff valve 320 minimizes the fluid pressure delivered from the negative control valve 322 to the chamber 264 of the servomechanism control section 58a. This of course results in the reduction of the displacement of the pump 10 to a minimum. Only the fluid pressure rises to and maintained at the predetermined maximum working pressure of the system.

The pump control system of FIGS. 12 and 13 has so far been described on the assumption that no energizing current is fed from the controller 230a to the proportional solenoid 218 of the torque control valve 42a. The following, then, is the discussion of operation when the solenoid 218 is variously energized, or deenergized, from the controller 230a.

Let it first be assumed that the control lever of the engine fuel injection pump has now been positioned for the maximum output condition of the engine. The speed sensor 228 will sense this maximum output condition from the maximum rpm of the engine when it is unloaded, and will deliver to the controller 230a a signal representative of that engine output condition. The controller 230a leaves the proportional solenoid 218 unenergized when the engine 12 is in the maximum output condition. Accordingly the control system hydraulically operates just as set forth in the foregoing. The torque demand of the pump 10 in this case is as represented by the curve 380 in the graph of FIG. 14. FIG. 15 indicates at 382 the torque curve of the engine when it is in the maximum output condition. The torque demand of the pump 10 corresponds to a predetermined point A on the torque curve 382. The point A is preferably the rated output torque of the engine.

When the fuel injection control lever is positioned for an intermediate output condition of the engine 12, with a torque curve indicated at 384 in FIG. 15, the speed sensor 228 senses this particular output condition and delivers a corresponding output to the controller 230a. The controller responds to the speed sensor output by delivering to the proporportional solenoid 218 of the torque control valve 42a an energizing current of magnitude corresponding to the difference (A−B) between the point A on the torque curve 382 of the maximum output condition and a predetermined point B on the torque curve 384 of the intermediate output condition.

Energized as above, the solenoid 218 thrusts its plunger 220 forward, leftwardly as seen in FIG. 13, with a force proportionate with the magnitude of the input current. The thrusted plunger causes displacement of the torque control valve spool 280 via the three pistons 282, 284 and 286 against the force of the spring 296, with the result that the output pressure of the torque control valve 42a decreases to an extent depending upon the magnitude of the energizing current. Consequently the pressure in the chamber 264 of the servomechanism control section 58a decreases correspondingly through the above described procedure, causing a corresponding decrease in the displacement of the pump 10.

Figure 14:
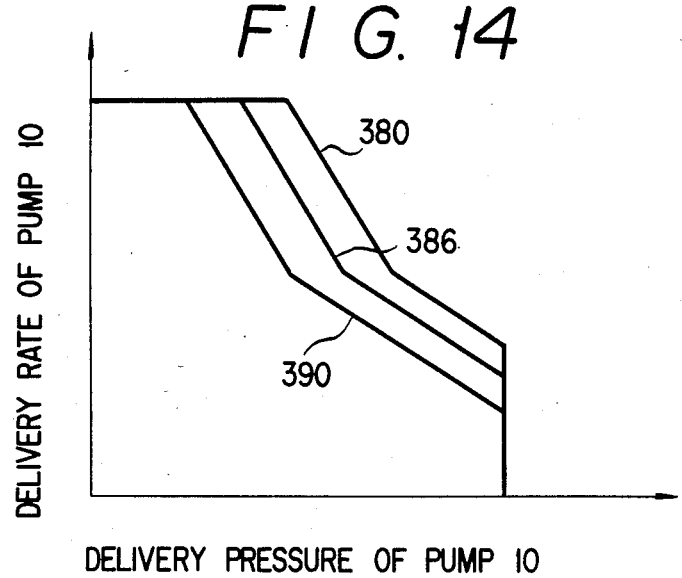
FIG. 14 is a graph plotting the relationship between the output pressure and delivery rate of the variable displacement pump in the various output conditions of the engine, as controlled by the pump control system of FIGS. 12 and 13.
Figure 15:
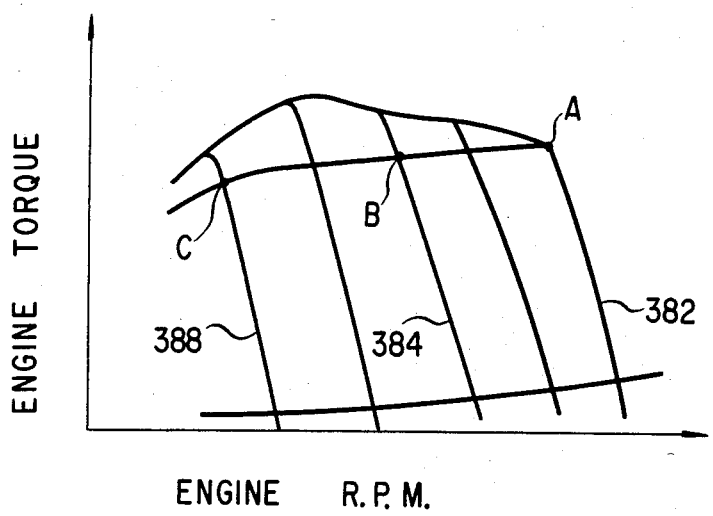
FIG. 15 is a graphhic representation of the output torque characteristics of the engine of the pump control system of FIGS. 12 and 13 in its various output conditions, the graph being further explanatory of the way the pump displacement is controlled by the FIGS. 12 and 13 system.

FIG. 14 indicates at 386 the torque demand of the pump 10 of the above decreased displacement. It will be noted that the torque demand in the intermediate output condition of the engine is less than that in the maximum output condition. The reduced torque requirement of the pump serves to prevent the stalling of the engine and to improve its fuel consumption rate.

When the fuel injection control lever is positioned for a minimum output condition (idling) of the engine 12, in which the engine offers a torque curve 388 of FIG. 15, the speed sensor 228 again senses this output condition from the engine rpm and delivers to the controller 230a a signal indicative of that output condition. The controller 230a responds by delivering to the solenoid 218 of the torque control valve 42a an energizing current of magnitude corresponding to the difference (A−C) between the point A on the torque curve 382 of the engine 12 in the maximum output condition and a predetermined point C on the torque curve 388 in the minimum output condition. The energized solenoid 218 thrusts its plunger 220 forwardly with a force proportionate with the magnitude of the energizing current.

Since the difference (A−C) is greater than the difference (A−B), the torque control valve spool 280 travels leftwardly against the force of the spring 296 to a greater degree than when the engine is set in the intermediate output condition. Thus the output pressure of the torque control valve 42a, and therefore the pressure in the chamber 264 of the servomechanism control section 58a, decrease further to correspondingly reduce the displacement of the pump 10.

As will be seen from the curve 390 of FIG. 14, the torque demand of the pump 10 further decreases to prevent engine stalling and to improve its fuel consumption rate.

In the control system of FIGS. 12 and 13 the torque control valve 42a is further adapted to operate in response to the output pressure of the second variable displacement pump 10' delivered to the fluid chamber 316 for acting on the piston 286. The pump displacement may therefore be controlled in accordance with the sum of the output pressures of the pumps 10 and 10'. This, however, is not an essential feature of the invention. The piston 286 with the associated fluid chamber 316 could be eliminated from the torque control valve if this feature were not desired.

THIRD FORM

Figure 16:
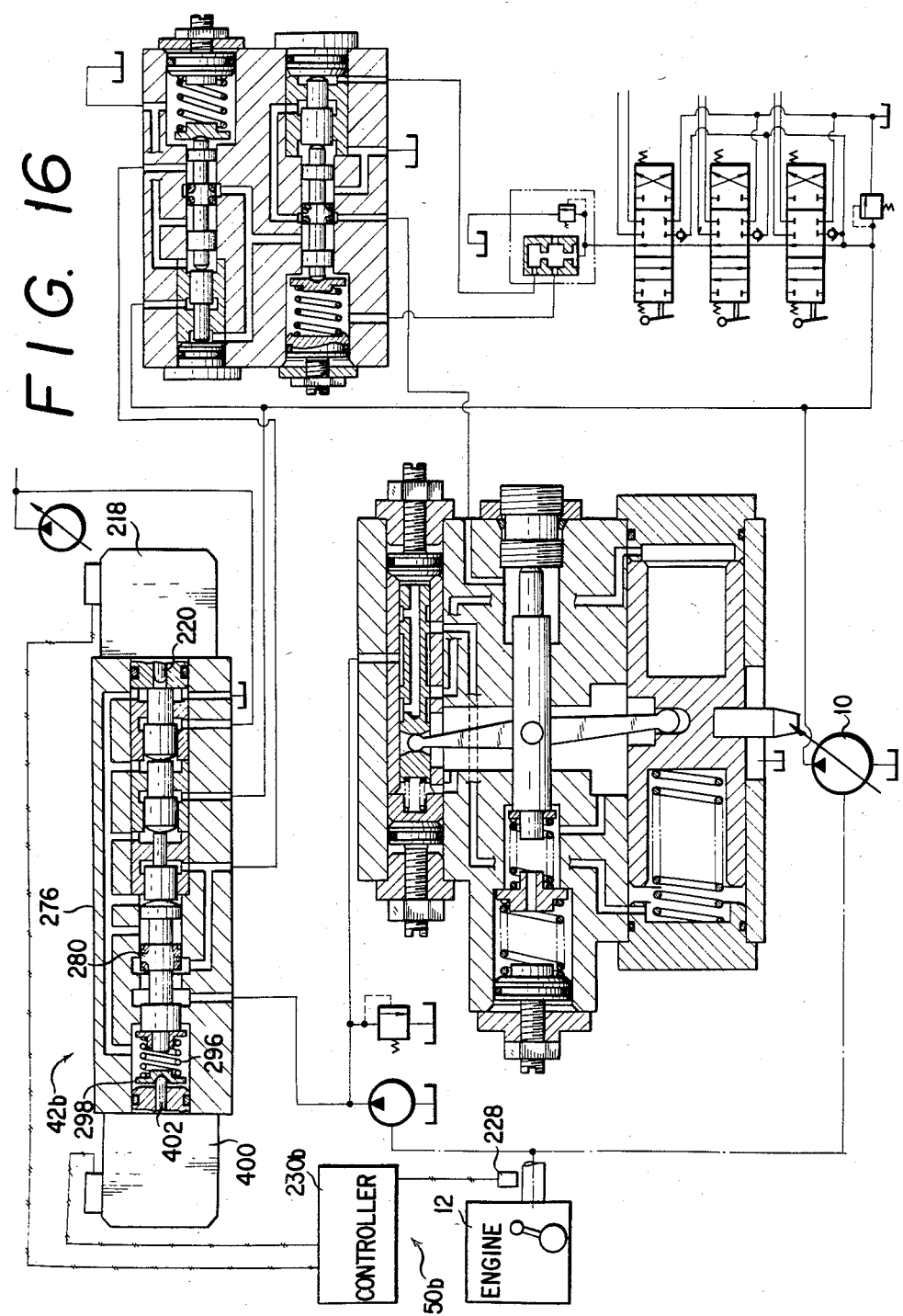
FIG. 16 is an illustration similar to FIGS. 2 and 13 but showing still another preferred form of the pump control system in accordance with the invention.

FIG. 16 is a detailed illustration of a third preferred embodiment of the invention, which in fact is a slight modification of the FIGS. 12 and 13 embodiment and is also akin to the FIG. 1 embodiment in that the pump displacement is controlled to suit each working condition of the engine.

A comparison of FIGS. 13 and 16 will reveal that this third embodiment is identical with the second embodiment except for the torque control valve. The modified torque control valve, generally designated 42b in FIG. 16, has a second proportional solenoid 400 mounted to the left hand end of its housing 276, in addition to the first proportional solenoid 218 on the right hand end of the valve housing. The second proportional solenoid 400 has a plunger 402 held against the retainer 298 of the spring 296 biasing the spool 280 rightwardly. The torque control valve 42b is similar to the torque control valve 42a of FIG. 13 in the other details of construction.

The first 218 and second 400 proportional solenoids are both electrically connected to a controller 230b of electrical control means 50b. The controller 230b operates in a slightly different manner in response to the output from the speed sensor 228. The method of operation of the modified controller will become apparent from the following description of operation.

Operation of Third Form

The operation of the FIG. 16 embodiment is analogous with that of the FIGS. 12 and 13 embodiment when the torque control valve 42b is not solenoid actuated from the controller 50b. This controller functions as follows when the engine 12 is set in different output conditions.

Upon sensing the maximum output condition of the engine 12 by the output from the speed sensor 228, the controller 230b does not energize either of the solenoids 218 and 400. The control system of FIG. 16 operates just as described above for the FIGS. 12 and 13 system when its torque control valve 42a is not solenoid actuated. The torque demand of the pump 10 in this case is as represented by the curve 404 in the graph of FIG. 17, and at a predetermined point D (rated torque) on the torque curve 406 of the engine 12 in the maximum output condition.

Figure 18:
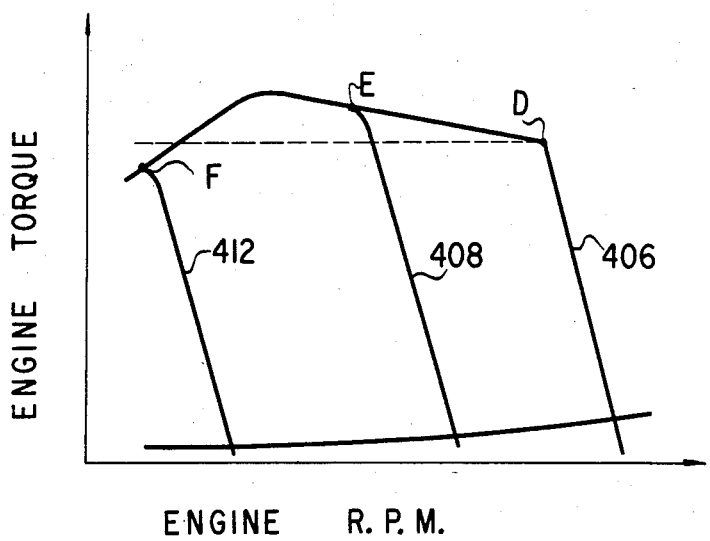
FIG. 18 is a graphic representation of the output torque characteristics of the engine of the pump control system of FIG. 16 in its various output conditions, the graph being further explanatory of the way the pump displacement is controlled by the FIG. 16 system.

When the engine fuel injection pump control lever is positioned for an intermediate output condition, the controller 230b responds to the output from the speed sensor 228 by energizing the left hand solenoid 400 of the torque control valve 42b with a current magnitude corresponding to the difference (E−D) between the point D on the maximum torque curve 406 and a predetermined point E, FIG. 18, on the engine torque curve 408 in the intermediate output condition. The engine torque E is greater than the rated torque D. Thrusted rightwardly with a force proportionate with the energizing current magnitude, the plunger 402 of the solenoid 400 causes rightward displacement of the torque control valve spool 280 via the spring 296. The result is an increase in the output pressure of the torque control valve 24b, which in turn results in an increase in the displacement of the pump 10.

Figure 17:
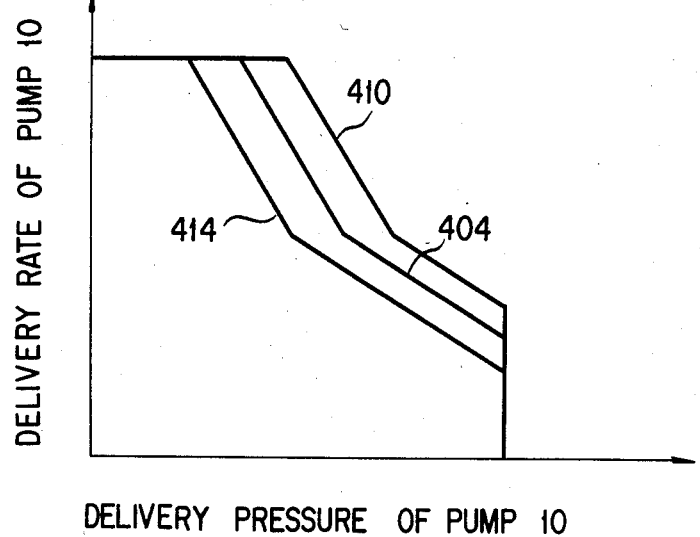
FIG. 17 is a graph plotting the relationship between the output pressure and delivery rate of the variable displacement pump in the various output conditions of the engine, as controlled by the pump control system of FIG. 16.

Thus the torque demand of the pump 10 becomes greater, as indicated at 410 in FIG. 17, to make most effective use of the engine output torque.

When the engine fuel injection pump control lever is positioned for the minimum output condition, the controller 230b responds to the output from the speed sensor 228 by energizing the right hand solenoid 218 of the torque control valve 42b with a current magnitude corresponding to the difference (D−F) between the point D on the maximum torque curve 406 and a predetermined point F, FIG. 18, on the engine torque curve 412 in the minimum output condition. The engine torque F is less than the rated torque D. The energized solenoid 218 thrusts its plunger 220 leftwardly with a force proportionate with the magnitude of the energizing current, causing displacement of the torque control valve spool 280 in the same direction against the bias of the compression spring 296. Consequently the output pressure of the torque control valve 42b decreases, and so does the displacement of the pump 10.

FIG. 17 represents at 414 the torque demand of the pump 10 which has had its displacement reduced as above to conform to the minimum output condition of the engine 12. The smaller torque demand of the pump serves to prevent the stalling of the engine.

It is to be understood that the above system configurations are simply illustrative of the principles of this invention. Numerous modifications may therefore be readily devised by one skilled in the art which embody the inventive concepts and which fall within the spirit and scope of the invention.

What is claimed is:

1. A fluid operated pump displacement control system comprising:
   (a) a prime mover having a plurality of output conditions having difference output torque characteristics;
   (b) at least one variable displacement pump driven by the prime mover for supplying fluid under pressure to actuator means;
   (c) a fixed displacement pump;
   (d) a servomechanism comprising:
      (1) a servoactuator section operatively coupled to the variable displacement pump for varying the per cycle displacement thereof in response to fluid pressure from the fixed displacement pump, said servomechanism further including:
         (a) a housing; and (b) a servopiston in said servoactuator section slidably mounted in said housing so as to define a pair of opposed fluid chambers and operatively coupled to the variable displacement pump for varying the displacement thereof;

(2) a servovalve section for controlling communication between the fixed displacement pump and the servoactuator section of the servomechanism, a servovalve spool slidably mounted in said housing for placing said fixed displacement pump in and out of communication with a selected one of the fluid chambers on the opposite sides of said servopiston; and (3) a control section operated by fluid pressure for controllably actuating the servovalve section, said control section including control piston means mounted in said housing for sliding motion in response to fluid pressure actuation under the control of the torque control valve; and a control lever having a pair of opposite ends operatively engaged with said servopiston and with said servovalve spool and medially pivoted to said control piston means for moving said servovalve spool in response to the movement of said control piston means in order to cause displacement of said servopiston in a manner controlled in accordance with the movement of said control piston means;

(4) the servoactuator section, servovalve section and control section of the servomechanism being further structurally and functionally interrelated so that the controlled fluid pressure actuation of the control section results in a controlled change in the displacement of the variable displacement pump;

(e) a torque control valve for controllably actuating the control section of the servomechanism by fluid pressure from the fixed displacement pump in order to correspondingly vary the displacement, and therefore the torque requirement, of the variable displacement pump; and (f) control means for sensing the output condition in which the prime mover operates and for actuating the torque control valve so as to cause the same to control the torque requirement of the variable displacement pump in accordance with the sensed output condition of the prime mover, thereby making it possible to make utmost use of the output torque of the prime mover in the entire speed range thereof.

2. A fluid operated pump displacement control system comprising:

(a) a prime mover having a plurality of output conditions having different output torque characteristics;

(b) at least one variable displacement pump driven by the prime mover for supplying fluid under pressure to actuator means;

(c) a fixed displacement pump;

(d) a servomechanism comprising:

(1) a servoactuator section operatively coupled to the variable displacement pump for varying the per cycle displacement thereof in response to fluid pressure from the fixed displacement pump;

(2) a servovalve section for controlling communication between the fixed displacement pump and the servoactuator section of the servomechanism; and (3) a control section operated by fluid pressure for controllably actuating the servovalve section;

(4) the servoactuator section, servovalve section and control section of the servomechanism being further structurally and functionally interrelated so that the controlled fluid pressure actuation of the control section results in a controlled change in the displacement of the variable displacement pump;

(e) a torque control valve for controllably actuating the control section of the servomechanism by fluid pressure from the fixed displacement pump in order to correspondingly vary the displacement, and therefore the torque requirement, of the variable displacement pump;

(f) control means for sensing the output condition in which the prime mover operates and for actuating the torque control valve so as to cause the same to control the torque requirement of the variable displacement pump in accordance with the sensed output condition of the prime mover, thereby making it possible to make utmost use of the output torque of the prime mover in the entire speed range thereof;

(g) implement control valve means for selectively placing said actuator means in communication with said variable displacement pump and with a fluid drain;

(h) a drain sensor connected between said implement control valve means and said fluid drain for fluid pressure actuation of said control section of said servomechanism in accordance with the flow rate of the fluid being drained from said implement control valve means; and (i) a negative control valve connected between said torque control valve and said control section of the servomechanism for controlling said servomechanism in response to fluid pressure from said drain sensor.

3. The pump displacement control system of claim 2 further comprising a cutoff valve connected between the torque control valve and the negative control valve for reducing the displacement of the variable displacement pump to a minimum when the output pressure thereof rises to a predetermined degree.

* * * * *